May 30, 1961

E. C. WEBB 2,986,340

DEVICE FOR SUPPORTING AND POSITIONING
A WATER CONDITIONING PELLET

Filed May 4, 1959

INVENTOR.
Ernest C. Webb,
BY
John H. Leonard,
his ATTORNEY.

May 30, 1961

E. C. WEBB 2,986,340

DEVICE FOR SUPPORTING AND POSITIONING
A WATER CONDITIONING PELLET

Filed May 4, 1959

INVENTOR.
Ernest C. Webb,
BY
John H. Leonard,
his ATTORNEY.

United States Patent Office 2,986,340
Patented May 30, 1961

2,986,340
DEVICE FOR SUPPORTING AND POSITIONING A WATER CONDITIONING PELLET
Ernest C. Webb, 24721 W. Lake Road, Bay Village, Ohio
Filed May 4, 1959, Ser. No. 810,722
5 Claims. (Cl. 239—315)

This invention relates to a device for supporting water soluble conditioning pellets or tablets in relation to a stream of water discharged by a conduit so as to assure effective washing of the pellet by the water and uniform conditioning of the water by the pellet preparatory to the discharge of the water for use.

The conditioning of water for bubble baths, aroma, softening and the like, is customarily effected by dropping water soluble conditioning compositions, tablets, or pellets into the water.

In some instances such pellets have been placed in loose condition in the shower heads and the like so as to condition the water to some extent as it passes from the discharge port of the water conduit to the shower head spray ports preparatory to discharge into the tub or basin. However, in such arrangements, the water is not efficiently applied to the pellet and thereby conditioned uniformly, and does not wash the pellet away uniformly, whereby the conditioning is erratic and unpredictable.

The principal object of the present invention is to provide a device for holding such a pellet or tablet in relation to the stream of water discharged from a supply conduit so that the water is constrained to wash the pellet effectively and become more uniformly conditioned during the discharge of the water from the conduit.

Another object of the invention is to support the pellet in the device in a manner such that it is to a large degree used up before it can escape from the holding device.

A more specific object is to support the pellet in the path of discharge of the outlet port of the water conduit or supply line, but in spaced relation along the path from the port so that there is a continuous and direct impingement of the stream of water against the pellet, and to constrain the pellet to a position in which the water can pass readily not only against the face of the pellet exposed toward the port but also along the periphery and, if desired, the opposite face of the pellet.

A more specific object is to construct the device so that, while the pellet is so supported, the water impinging on the pellet can surge and can be deflected in part back toward the port in surrounding relation to the oncoming stream discharged by the port, thus assuring a high degree of ebullition of the water for more effectively washing the tablet thereby.

A more specific object is to provide a device adapted to be fastened onto the ordinary discharge spout of a bath faucet for supporting the pellet in the manner and for the purposes described.

Another specific object is to provide a shower head incorporating the pellet supporting device so arranged that the water passing through the shower head is conditioned effectively preparatory to its discharge.

A specific advantage resides in the manner in which the device is constructed for convenience and economy in manufacture and assembly.

Various objects and advantages will become apparent from the following specification, wherein reference is made to the drawings, in which.

Figure 1:
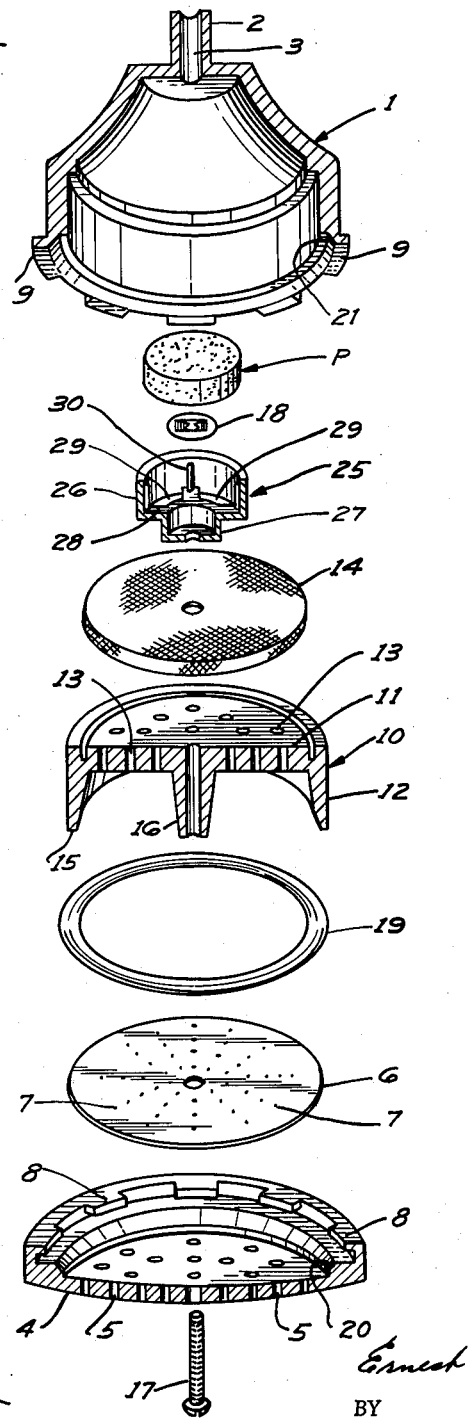
Fig. 1 is an exploded front elevation, partly in section, of a shower head embodying the device of the present invention.
Figure 2:
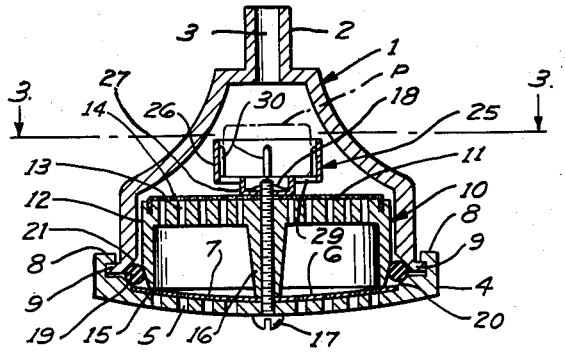
Fig. 2 is an axial sectional view of the assembled structure shown in Fig. 1.
Figure 4:
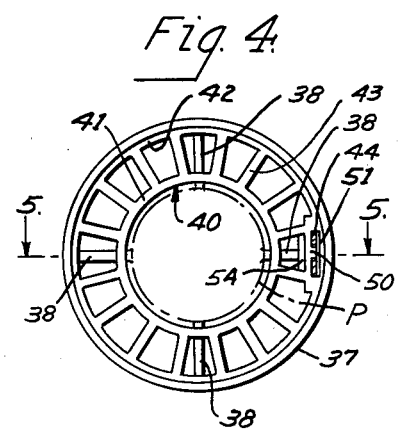
Fig. 4 is a top plan view of a pellet holding device for connection to a water faucet spout, the support therefor being shown in horizontal cross section.
Figure 5:
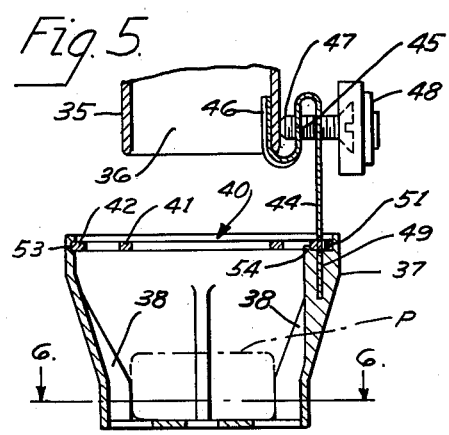
Fig. 5 is a fragmentary vertical sectional view taken on the line 5—5 of Fig. 4.
Figure 3:
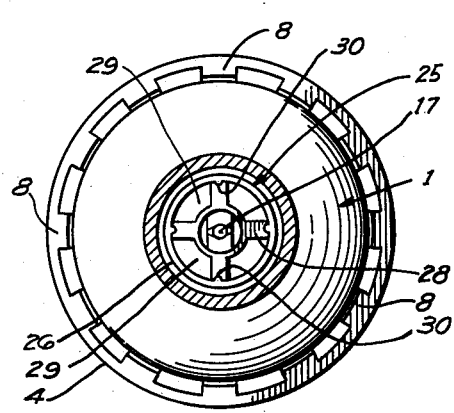
Fig. 3 is a cross sectional view taken on the line 3—3 of Fig. 2, the pellet being omitted.
Figure 6:
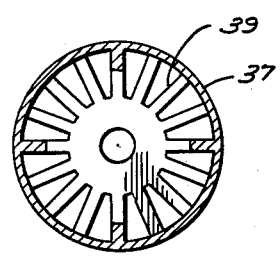
Fig. 6 is a horizontal sectional view taken on the line 6—6 of Fig. 5.
Figure 7:
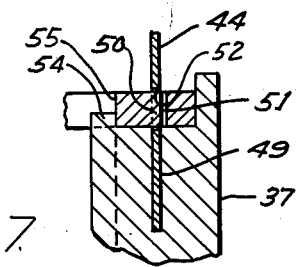
Fig. 7 is an enlarged fragmentary vertical sectional view of a portion of the device illustrated in Figs. 4 through 6, illustrating the manner of assembly of certain parts thereof.

Referring first to Figs. 1 and 2, the device of the present invention is shown in combination with a shower head of the general character described in my United States Letters Patent No. 2,874,001, issued February 17, 1959.

As therein more fully described, the shower head comprises a body 1, having at one end a conduit 2 which is connectible to an extraneous water line so as to form a continuation thereof. The conduit 2 is coaxial with the body 1 and has a discharge port 3 discharging axially toward the opposite end of the body. The opposite end of the body is closed by a suitable detachable cap 4 having a plurality of spray jet passages 5 therein.

On the inner face of the cap 4, is a thin flexible orifice disc 6 having therein discharge orifices 7, each of which is aligned with a passage 5 in the cap and is of much smaller diameter than its associated passage 5.

Connecting means, such as lugs 8 on the cap and cooperable lugs 9 on the body provide a ready means for attaching and detaching the cap 4.

Mounted in the body for assuring a proper flow of water from the port 3 to the orifices 7 is a baffle means indicated generally at 10. The baffle means is in the form of an inverted cup having a closure wall 11 at one end and an annular peripheral wall 12 extending therefrom toward the cap. The bottom wall 11 faces toward the port 3 and is provided with a multiplicity of passages 13 which are arranged to distribute the water from the port 3 and direct it toward the orifices 7 in a direction of flow generally parallel to the axes of the orifices 7. The outer face of the end wall 11 exposed toward the port 3 is covered by a suitable filter screen 14 which is coextensive radially therewith.

The baffle means 10 is disposed with the lower edge 15 of its peripheral wall 12 juxtaposed against the inner face of the orifice disc 6. On the element 10 is a central boss 16 having an axial bore which accommodates the bolt 17. The bolt 17 extends through the cap 4, disc 6, and the boss 16 and cooperates at its upper end with a suitable nut 18 by which the baffle means 10 is secured to the cap 5 for removal therewith.

A suitable O-ring 19 is provided and engages a suitable seat 20 in the cap 4 and lies in snug embracing relation to the outer surface of the peripheral wall 12 near the free edge thereof. A cooperating seat 21 is arranged in the body so that, when the baffle and O-ring are connected to the body, the O-ring forms a seal between the seats 20 and 21 and is squeezed radially inwardly of the cap into sealing engagement with the lower margin of the peripheral wall 12, thus constraining all of the water discharged by the port 3 to pass through the screen 14, and baffle passages 13, in order to reach the orifices 7.

As pointed out, this structure lends itself particularly well to the treating of the water with pellets, tablets, and the like preparatory to its discharge.

For this purpose, a collar or positioning means is provided for holding a pellet P in the desired position relative to the port 3. In the form illustrated, the collar means comprises an annular collar 25, having a pellet accommodating portion with a peripheral wall 26, and a supporting portion therebeneath and indicated at 27. The collar 25 is coaxial with the port 3 and is open at the end facing toward the port 3. While the opposite end of the collar may be closed, it preferably is bridged by a spider 28 which provides passages 29 between its arms through which part of the water entering the collar can discharge downwardly toward the baffle means 10. The supporting portion 27 of the collar means is arranged to accommodate the nut 18 and the upper end of the bolt 17, but is otherwise sealed.

In order to hold the pellet and tablet in alignment with the port 3, suitable spacing means are provided. These spacing means may be in the form of ribs 30 formed directly on the inner surface of the peripheral wall 26 and extending inwardly toward the axis of the collar 25, thus holding the pellet out of contact with the inner peripheral wall surface so that the water entering the collar can come in contact with the periphery of the pellet as well as the pellet end facing toward the port.

The collar is arranged so that its open end is spaced a substantial distance from the discharge port 3 of the conduit so that the path of the water discharged from the port 3 is directed onto the pellet, yet an outlet means is provided for the water even though the lower end of the collar be closed. This outlet means may be the space between the peripheral wall 26 at the open end and the stream of the water issuing from the port 3.

By this arrangement the water impinges directly on that face of the pellet P which faces toward the port 3 and circulates readily around the peripheral wall of the pellet, and is agitated and stirred by the force of the incoming stream, and then returns out of the collar in an annular stream surrounding the incoming stream from the port 3, and thence flows back down through the baffle passages 13 to the discharge orifices 7.

Thus the pellet P is subjected effectively to the washing action of the water issuing from the port 3, the water which has washed the pellet is well stirred preparatory to reaching the orifices 7 so that it is uniformly conditioned preparatory to discharge, the flow is straightened out by the baffle means 10 so that it reaches the orifices 7 in a generally axial direction.

As mentioned, the lower end of the collar 25 may be in the form of a spider with openings 29 between the spider arms. In this form, a substantial portion of the water passing between the peripheral wall 26 and the pellet can pass directly through the lower end of the collar and thus strike the baffle.

In operation, part of the water returns out of the upper end of the collar 25 and part discharges through the lower end, some of it washing the underside of the pellet P.

To insert a pellet, all that is necessary is to turn the cap a few degrees so as to disconnect the connecting elements 8 and 9 from each other, remove the cap 4 and with it the baffle 10, the O-ring, and the collar 25, all of which are removed as a unitary structure. The pellet is placed in the collar 25 and the cap replaced.

The upper end of the collar may be close enough to the peripheral walls of the body, at the plane of the upper end of the collar 25, so that no large portion of the pellet can be washed out of the collar by the reversed flow stream of water and pass between the upper edge of the collar and the peripheral wall of the body at that location. Thus all except the small residue or small particles of the pellet are confined in or adjacent the path of the incoming stream. Should any small portion of the pellet escape between the collar and body 1, however, it would be prevented by the filter screen from reaching and clogging the orifices 7 and would be washed by the ebullient water above the screen 14.

Since the pellet is maintained in a limited space in the path of discharge of the port 3 and in spaced relation from the port during the operation, until it has been substantially dissolved and greatly reduced in size or broken up, very effective and uniform washing of the pellet results.

In the form of the invention above described, the shower head and various parts thereof provide the attaching means which connect the device to the conduit for supporting the positioning or collar means in spaced relation from the port 3 along the path of flow of the stream of water from the port 3.

It is to be noted that the collar and baffle have been described as being annular and this wording is not meant to be limited merely to annular members whose outer or inner periphery is circular as obviously the peripheral walls may be made polygonal, if desired.

In the form of the invention illustrated in Figs. 4 through 7, the shower head is not used as the attaching means but instead a separate attaching means is provided. This modified form of the device is adapted to be detachably connected to the conventional spout 35 of an ordinary water faucet such as commonly used in bathtubs and the like, the spout 35 itself providing the conduit and having a discharge port 36 at its lower end. The positioning and holding device comprises, generally, a collar 37 arranged to be detachably connected to the spout 35 so that the upper end of the collar 37 is coaxial with, but spaced axially from the discharge port 36 of the spout. The spacing may vary but preferably is from ⅜ inch to 1 inch. The collar is provided with a plurality of spacing means in the form of inwardly projecting ribs 38 which are adapted to hold the pellet P in spaced relation inwardly from the inner peripheral wall of the collar so that the water which discharges from the port 36 and impinges on the upper face of the pellet can flow around the sides of the pellet.

The bottom of the collar 37 may be arranged so that water can discharge therethrough. For this purpose a spider 39 is connected to the lower end of the collar.

The ribs 38 extend a sufficient distance inwardly toward the axis of the collar so that the water passing around the pellet P can readily pass downwardly to the underside of the pellet and out through the spaces between the arms of the spider 39.

In order to prevent the pellet from washing back out of the top, the upper end of the collar is provided with a suitable cap 40 which is in the form of an inner annular ring 41 and an outer annular rim 42 with spider arms 43 extending from the ring 41 to the rim 42. The central passage of the ring 41 is coaxial with the collar and since the water discharged from the port 36 is discharged through the central passage, the pellet P cannot pass out through the central passage, though it can be inserted therethrough.

The ribs or arms 43 prevent the pellet from escaping with the reversely flowing water between the rim 42 and the ring 41. This is particularly desirable when the pellet has been washed down to a small portion of its original size.

In order to support the collar 37 in coaxial spaced relation to the port 36 an attaching means in the form of an arm 44 is provided. The arm may be made of a single upright length of wire or strip metal stock which, near its upper end, has a portion 45 bent back toward its lower end and thence reversely bent to provide a portion 46 which extends back upwardly in laterally spaced relation to the portion 45 so that the spout 35 can be received between the portions 45 and 46. A suitable screw 47 is threadedly engaged with the arm 44 and the portion 45 and is provided with a suitable operating knob 48 by which it can be screwed into firm engagement with the spout and support the arm, and thereby the collar, from the spout. The portion 46 of the arm is preferably flattened and made concave toward the axis of the spout on a radius such that it conforms more nearly to the inner surface of the spout which it engages.

For convenience in assembly, the arm is arranged to be held in connected relation with the collar by means of the cooperation of a suitable upright slot 49 in the collar and a tongue 50 on the cap 40. For this purpose, the slot 49 is made relatively deep so that the free lower end of the arm 44 can be pressed readily thereinto and be held frictionally in position. The cap 40 is provided with a passage 51 through which the arm extends. The passage 51 is slightly larger than the cross section of the arm 44 but the tongue 50 of the cap is such that when the cap is in place, the tongue 50 is engaged in an aperture 52 in the arm 44 and the arm is thus held by tongue 50 of the cap in operating position.

The upper end of the collar is provided with an annular seat 53 facing toward the upper end of the collar and on which the cap 40 is adapted to seat. Adjacent the arm 44 the collar is provided with an upstanding ledge 54 adapted to engage the inner peripheral surface portion 55 of the outer rim 42 of the cap 40. To install the cap and arm 44, the arm is passed endwise through the passage 51 in the cap and its lower end is inserted in the slot 49, the tongue 50 snapping into the aperture 52. The rim of the cap adjacent the passage 51 is disposed between the inner peripheral surface of the open upper end of the collar and the ledge 54, the arm 44 being pressed to the right in Fig. 4 and stressed to permit this engagement, if necessary. While the outer rim of the cap is pressed between the ledge 54 and an inner peripheral surface 55 of the upper end of the collar, the remainder of the rim 42 of the cap is pressed into seating position and thereby is fitted into the upper end of the collar with a snap or stress fit. The holding of the cap 40 in position is augmented by the flexure, if any, occasioned in the arm 44. The cap 40 and the arm 44 mutually cooperate to hold each other effectively in position.

Thus there is provided a holding and positioning device in the form of a collar means which can hold and position the pellet properly, and an attaching means for holding the device in a position with respect to the faucet or discharge port of the conduit so that the pellet is constrained to a position within a limited space in the path of discharge of the port of the conduit and in spaced relation endwise thereof and in spaced relation to the peripheral wall of the collar so that all surfaces of the pellet are readily accessible to the water.

If desired, the lower end of the collar may be closed so that all of the water passing the pellet must return upwardly in surrounding relation to the stream being discharged toward the pellet by the conduit or spout 35.

By closing the lower end of the collar, or by varying the size of the passages, if such are provided, differences in the manner and rate of washing of the surface of the pellet by the water can be obtained.

In both forms of the device illustrated, the water and pellet cooperate to effect the primary object of causing more nearly uniform conditioning of all of the water being discharged at any given instant and more nearly uniform conditioning of the water generally throughout the period during which the pellet is being eroded away.

In instances some, though not all, of the advantages of using the collar 25 are obtained by placing the pellet in the shower head between the baffle or screening means and discharge port of the supply conduit without providing the collar 30.

For example, in the form of the invention shown in Fig. 1, the pellet may be interposed in the shower head between the screen 14 and port 3. Fair results can be obtained in such an instance without the collar, particularly when the space between the screen and port of the conduit is relatively small and keeps the pellet in, or within close proximity to, the incoming stream of water. The baffle or screening means 10 prevents the pellet, or broken off fragments thereof, from reaching the ports 7.

Having thus described my invention, I claim:

1. A device for positioning and supporting a water conditioning pellet and comprising a pellet holding means in the form of a hollow body adapted to contain a pellet and having a peripheral wall and being open at one end to provide a water inlet and having a bottom wall with a water outlet therein aligned with the inlet, attaching means connectible to a water conduit having discharge port means and connected to the holding means for supporting the holding means with its inlet in alignment with the port means and in closely spaced relation to the port means and facing toward the port means and positioned in the direct path of discharge from the port means, said inlet being of a cross sectional area, in a plane transverse to the axis of the port means and direction of flow of water therefrom, more than large enough to receive substantially all the water discharged by the conduit so that part of said water can discharge from the holding means between the incoming water and the peripheral wall of the holding means, spacing means interiorly of the holding means and operative to engage the side of the pellet and to constrain the pellet in the holding means within a limited space in which the pellet is spaced from the inlet of the holding means, is directly within the path of the water discharged by the conduit, and is in spaced relation to said peripheral wall so that part of the water from the port means strikes the pellet and flows outwardly across the pellet and thence around and along the sides of the pellet and discharges from said outlet, and part of the water discharges back through said inlet.

2. A structure according to claim 1 wherein said holding means includes means adjacent its said inlet and positioned to obstruct the escape of the pellet out of its said inlet.

3. A structure according to claim 1 wherein said spacing means are ribs connected to the holding means and extending inwardly from the peripheral wall.

4. A structure according to claim 1 wherein the holding means includes an annular member, coaxial spider members in the ends of the member, respectively, the spider members at said one end having a central passage, and the spacing means are elongated ribs on at least one of the members and extend endwise generally lengthwise of the annular member and, transversely, inwardly of the annular member.

5. A structure according to claim 1 wherein the holding means is an annular member having, in its peripheral wall, a slot extending endwise of the member, the spider at said one end is arranged for snap fastening engagement with the member and has a passage aligned with said slot, said attaching means includes a resilient arm member extending through the passage and into the slot, and said passage and slot having their walls positioned, in a direction transversely of the peripheral wall, so as to deflect that portion of the resilient member which is outside of the slot out of its normal alignment with the slot and thereby pinch it into connecting relation to the annular member.

References Cited in the file of this patent
UNITED STATES PATENTS

| | | |
|---|---|---|
| 1,491,212 | Thomson et al. | Apr. 22, 1924 |
| 1,751,524 | Moss | Mar. 25, 1930 |
| 1,973,319 | Nelson | Sept. 11, 1934 |
| 2,304,867 | Wenker | Dec. 15, 1942 |
| 2,647,797 | Moss | Aug. 4, 1953 |
| 2,659,627 | McConnell | Nov. 17, 1953 |
| 2,799,534 | Norden et al. | July 16, 1957 |
| 2,874,001 | Webb | Feb. 17, 1959 |

FOREIGN PATENTS

| | | |
|---|---|---|
| 530,757 | Germany | Aug. 1, 1931 |